A. F. DIMOND.
CIRCULAR SAW-TEETH.

No. 171,604. Patented Dec. 28, 1875.

Witnesses
Andrew J. Bigley
R. Deakers

A. F. Dimond, Inventor
By
Connolly Bros & Wight
Attorneys

N. PETERS, PHOTO-LITHOGRAPHER, WASHINGTON, D. C.

UNITED STATES PATENT OFFICE.

ALBAN F. DIMOND, OF PITTSBURG, PENNSYLVANIA, ASSIGNOR OF ONE-HALF HIS RIGHT TO GEORGE W. DEWSNAPP, OF SAME PLACE.

IMPROVEMENT IN CIRCULAR-SAW TEETH.

Specification forming part of Letters Patent No. 171,604, dated December 28, 1875; application filed December 28, 1874.

*To all whom it may concern:*

Be it known that I, ALBAN F. DIMOND, of Pittsburg, in the county of Allegheny and State of Pennsylvania, have invented certain new and useful Improvements in Circular-Saw Teeth; and I do hereby declare the following to be a full, clear, and exact description of the invention, such as will enable others skilled in the art to which it pertains to make and use it, reference being had to the accompanying drawings, which form part of this specification, in which—

Figure 1:
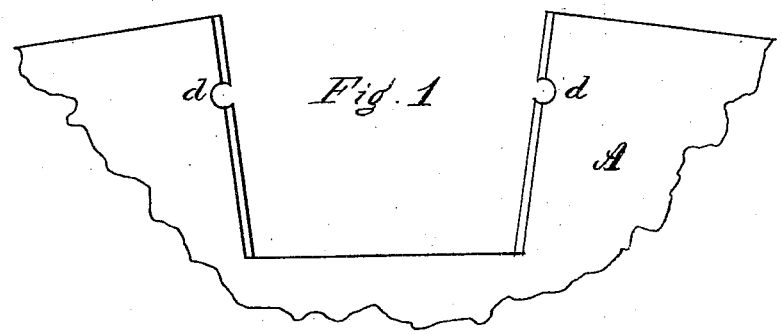
Figure 2:
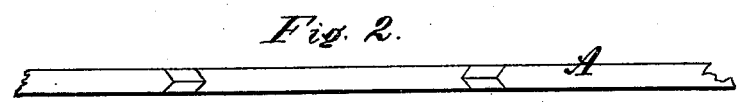
Figure 3:
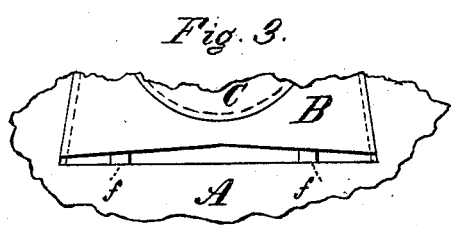
Figure 4:
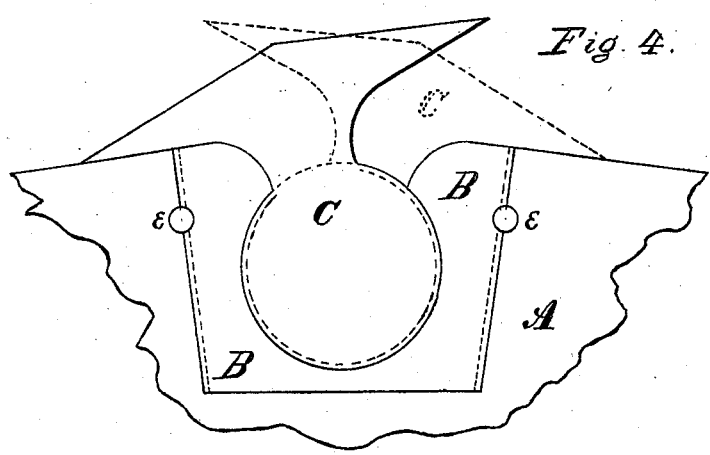

Figure 1 is a view of recess for jaw-piece. Fig. 2 is a plan view of same. Fig. 3 is a modification of same. Fig. 4 is an elevation of tooth when inserted, dotted lines showing grooves, and also the reverse position of tooth.

My invention relates to an improvement in insertible teeth for circular saws; and consists in making the tooth double and automatically reversible, so that the saw may run and cut in both directions equally well, and thereby utilize the time which is now wasted in the gig-back motion of the carriage, or board or log to be sawed.

Under the old style the timber to be cut— *e. g.* a boom—is placed on the reciprocating carriage, and is held by dogs and clamps. The carriage is run by gearing, and feeds the log to the saw. When the cut from end to end is made the gearing is reversed, and the log gigged back to the starting-point, and again fed to the saw.

I construct an insertible tooth with two cutting-portions pointing in opposite directions, and working in a grooved segment, also insertible in the body of the saw.

By this construction, when the log is sawed through, the machinery is reversed, and the saw cuts backward through the log to the first starting-point; thus the time generally wasted in gigging back is now utilized in sawing another board or piece, making a saving of nearly one-half of the time.

More particularly my construction is as follows: The body of the saw is made with recesses around its periphery. These recesses are, preferably, of a dovetail form, either right or inverted, and their side edges are made V-shaped in section, so as to form a guide and retainer for the re-entering jaw-piece, which is inserted in each of them. This jaw-piece conforms, in outline, with the recess, except the outside, and its side edges are V-grooved to fit the sides of the recess. The jaw-piece is held in position by rivets on its edges or keys wedging under its base, according as the piece is a right or inverted dovetail.

I do not confine the jaw-piece to the dovetail form, as any other may suit, perhaps, as well. The piece is cut away from the outer edge inwardly, the cut curving and terminating in a great segment of a circle, thus forming a bed for the tooth, and a confining-throat.

The circular segment is V-edged, as also the circular portion of the tooth, which fits in the same, and rotates or rocks therein. The tooth is T-shaped, having two cutting-ends, only one of which can be in use at a time, while the other on its inner edge shoulders upon the periphery of the saw-body and throat of the tooth-bed, and is firmly supported thereby. Before putting in the dovetail segment or jaw-piece, the circular bed-plate of the tooth is sprung into the jaws of the former, where the ridge and groove corresponding prevent lateral motion, while admitting of its rocking or canting to reverse. In the case of a right dovetail, the fixing and tightening of the jaw-piece are accomplished by making the inner edge two planes, inclining to either side, and keying it outwardly with two small wedges or keys.

Referring to the drawings herewith, A designates a broken segment of the body of the saw, showing the recess; and the jaw-piece is represented by B. The side edges of this recess are V-shaped in section, and correspond in shape to the edges of the jaw-piece. C is the tooth, made double, and so shaped that when canted it fits and shoulders on the periphery of the saw-body and the edges of the jaw-piece. *d d* are recesses for the pins *e e* to keep the jaw-piece in place when adjusted. *f f* are small keys or wedges for the same purpose in the modification.

Having fully described my invention, what I claim, and desire to secure, is—

1. In combination with a circular saw a double reversible tooth, operating substantially as described.

2. As a new article of manufacture a reversible saw-tooth, for the purpose specified.

3. The combination of the double reversible tooth C, jaw-piece B, rivet-pins $e$ $e$ with the plate A, arranged and operating as described.

In testimony that I claim the foregoing I have hereunto set my hand this 19th day of December, 1874.

ALBAN F. DIMOND.

Witnesses:
 T. J. McTIGHE,
 PETER KREUTER.